(12) United States Patent
Kim (10) Patent No.: US 8,998,604 B2
(45) Date of Patent: Apr. 7, 2015

(54) INJECTION MOLD

(71) Applicant: Samsung Electronics Co., Ltd., Suwon-si (KR)

(72) Inventor: Hak Do Kim, Gwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 108 days.

(21) Appl. No.: 13/712,264

(22) Filed: Dec. 12, 2012

(65) Prior Publication Data

US 2013/0149409 A1 Jun. 13, 2013

(30) Foreign Application Priority Data

Dec. 12, 2011 (KR) ........................ 10-2011-0132843

(51) Int. Cl.
*B29C 45/42* (2006.01)
*B29C 45/17* (2006.01)
*B29C 45/40* (2006.01)

(52) U.S. Cl.
CPC ............. *B29C 45/1775* (2013.01); *B29C 45/42* (2013.01); *B29C 2045/4078* (2013.01)

(58) Field of Classification Search
USPC ....... 425/436 R, 444, 552, 556; 264/334, 336
See application file for complete search history.

(56) References Cited

U.S. PATENT DOCUMENTS

| 4,438,065 A * | 3/1984 | Brown .......................... 264/335 |
| 4,787,841 A * | 11/1988 | Simon ........................... 425/556 |
| 6,601,819 B2 * | 8/2003 | Mizukusa ........................ 249/79 |

FOREIGN PATENT DOCUMENTS

| JP | 2009-131975 | 6/2009 |
| KR | 10-2006-0098129 | 9/2006 |

* cited by examiner

*Primary Examiner* — Tim Heitbrink
(74) *Attorney, Agent, or Firm* — Staas & Halsey LLP (57) ABSTRACT

An injection mold including a first mold, a second mold disposed opposite to the first mold and configured to form a cavity having a shape that corresponds to an injection-molded product to be manufactured by being coupled to the first mold, an injection apparatus configured to inject molten resin in the cavity, and an adsorption apparatus configured to adsorb and separate the injection-molded product, which is manufactured by the first mold and the second mold, from the first mold, so that the separation of the injection-molded product is performed by the adsorption apparatus, and thus structures configured to separate the injection-molded product are omitted from the first mold and the second mold, thereby simplifying the structures of the first mold and the second mold.

19 Claims, 6 Drawing Sheets

INJECTION MOLD

CROSS-REFERENCE TO RELATED APPLICATIONS

This application claims the benefit of Korean Patent Application No. 10-2011-0132843, filed on Dec. 12, 2011, in the Korean Intellectual Property Office, the disclosure of which is incorporated herein by reference.

BACKGROUND

1. Field

Embodiments of the present disclosure relate to an injection mold configured to manufacture an injection-molded product by injecting and hardening molten resin at the injection mold.

2. Description of the Related Art

Injection mold is an apparatus configured to manufacture an injection-molded product having the shape that corresponds to a cavity in which injecting molten resin inside the cavity of the mold.

The injection mold as such includes a first mold and a second mold being coupled to each other and provided with a cavity having the shape that corresponds to the shape of a product to be manufactured, and an injection apparatus configured to inject molten resin in the cavity.

In addition, the injection mold includes a cooling path through which cooling fluid passes. Components configured to separate an injection-molded product manufactured at an inside a cavity from the mold, in other words, the components configured to push the injection-molded product from the mold, such as an ejecting pin, an ejecting panel, and a space block. Thus, at the injection mold, a space configured to install the cooling path and the components to separate an injection-molded product is needed to be secured.

SUMMARY

Therefore, it is one aspect of the present disclosure to provide an injection mold having a simplified structure thereof.

Additional aspects of the disclosure will be set forth in part in the description which follows and, in part, will be obvious from the description, or may be learned by practice of the disclosure.

In accordance with one aspect, an injection mold includes a first mold, a second mold, an injection apparatus and an adsorption apparatus. The second mold may be disposed opposite to the first mold and configured to form a cavity having a shape that corresponds to an injection-molded product to be manufactured by being coupled to the first mold. The injection apparatus may be configured to inject molten resin in the cavity. The adsorption apparatus may be configured to adsorb and separate the injection-molded product, which is manufactured by the first mold and the second mold, from the first mold.

In a state that the first mold and the second mold are spaced apart, the adsorption apparatus may be entered in between the first mold and the second mold to adsorb the injection-molded product.

The first mold may include a first core provided with a first mold surface having a shape that corresponds to one side surface of the injection-molded product to be manufactured, a sliding core movably installed at the first core, and a regulation member configured to regulate a movement of the sliding core. The second mold may include a second core provided with a second mold surface having a shape that corresponds to the other side surface of the injection-molded product to be manufactured.

The sliding core may include a regulation groove provided at one side thereof and into which a front end of the regulation member is entered. The injection mold may further include a first guide and a second guide. The first guide may be configured to guide the movement of the sliding core while installed at the sliding core. The second guide may be selectively coupled to the first guide while installed at the second core.

One of the first guide and the second guide may include a coupling protrusion being coupled to the other one of the first guide and the second guide. The other one of the first guide and the second guide may include a coupling groove being coupled to the coupling protrusion.

At least one of the first core and the second core may include a cooling path through which cooling fluid passes.

As described above, in a state that the first mold and the second mold of the injection mold are spaced apart, an adsorption apparatus enters in between the first mold and the second mold to separate an injection-molded product, so that the components configured to separate the injection-molded product from the first mold and the second mold may be omitted.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
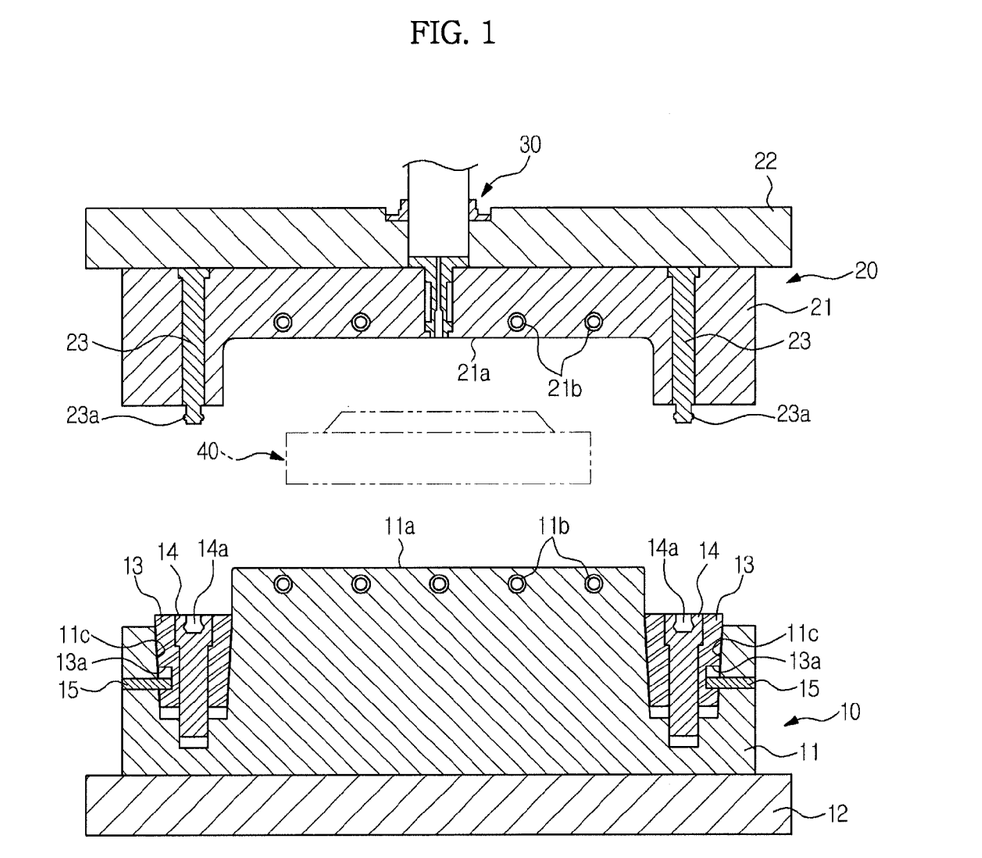
FIG. 1 is a schematic view of an injection mold in accordance with one.

As illustrated on FIG. 1, an injection mold in accordance with one embodiment includes a first mold 10, a second mold 20 disposed opposite to the first mold 10 and configured to form a cavity 'C' (refer to FIG. 2) having a shape that corresponds to an injection-molded product 'P' to be manufactured by being coupled to the first mold 10, an injection apparatus 30 configured to inject molten resin in the cavity 'C', and an adsorption apparatus 40 configured to adsorb and separate the injection-molded product 'P' that is manufactured from the first mold 10.

In the embodiment, at an upper side of the first mold 10 disposed at a bottom, the second mold 20 is movably installed in a vertical direction, so that the second mold 20 may be coupled to the first mold 10 or may be spaced apart from the first mold 10 as the second mold 20 is moved upward/downward.

The first mold 10 includes a first core 11 provided with a first mold surface 11a having the shape that corresponds to one side surface of the injection-molded product 'P' to be manufactured, and a first fastening panel 12 fixed to an opposite side surface of the first mold surface 11a of the first core 11.

In addition, the first mold 10 includes a sliding core 13 movably installed at the first core 11 to be moved by a certain distance and configured to move the injection-molded product 'P' by a certain distance, and a first guide 14 installed at the sliding core 13 and configured to guide the movement of the sliding core 13, and at the first core 10, a movement guide groove 11c at which the sliding core 13 is movably installed is provided.

The second mold 20 includes a second core 21 provided with a second mold surface 21a having a shape that corresponds to the other side surface of the injection-molded product 'P' to be manufactured, and a second fixing panel 22 fixed to an opposite side surface of the second mold surface 21a of the second core 21.

In addition, the second mold 20 includes a second guide 23 selectively coupled to the first guide 14, and configured to allow the sliding core 13 to move together with the first guide 14.

A coupling protrusion 23a is provided at a lower end of the second guide 23 so that the first guide 14 and the second guide 23 are selectively coupled to each other, and a coupling groove 14a is provided at an upper end of the first guide 14 so that the coupling protrusion 23a is selectively coupled to the coupling groove 14a.

As to regulate the movement of the sliding core 13, a regulation member 15 is installed at the first core 11, and at one side of the sliding core 13. A regulation groove 13a, through which a front end of the regulation member 15 is entered, is provided in a concave manner. At this time, the regulation groove 13a is configured to extend toward a moving direction of the sliding core 13 while having a length that is longer than the thickness of the regulation member 15, so that the sliding core 13 may move within a certain distance.

From the above, at the first core 11 and the second core 21, cooling paths 11b and 21b through which cooling fluid pass for a cooling are formed, respectively.

The injection apparatus 30 is installed at the second mold 20 to inject molten resin in the cavity 'C'.

The adsorption apparatus 40, in a state of the first mold 10 and the second mold 20 being spaced apart, is entered in between the first mold 10 and the second mold 20 to separate the injection-molded product 'P' being already manufactured on the first mold 10 from the first mold 10.

Figure 2:
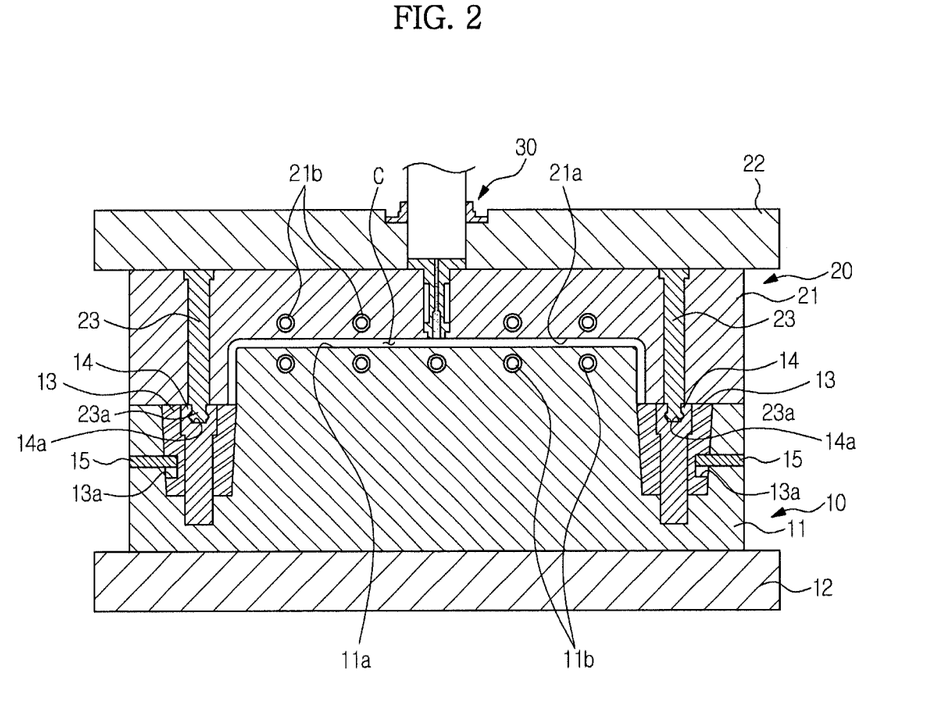
FIGS. 2 to 6 are schematic views of an operation of the injection mold shown in sequence in accordance with the one embodiment.

Next, the description of a motion of the injection mold composed as the above is as follows:

As illustrated on FIG. 2, first, in a state that the cavity 'C' is formed in between the first mold 10 and the second mold 20 as the first mold 10 and the second mold 20 are coupled to each other, molten resin is injected into an inside the cavity 'C' by the injection apparatus 30.

Figure 3:
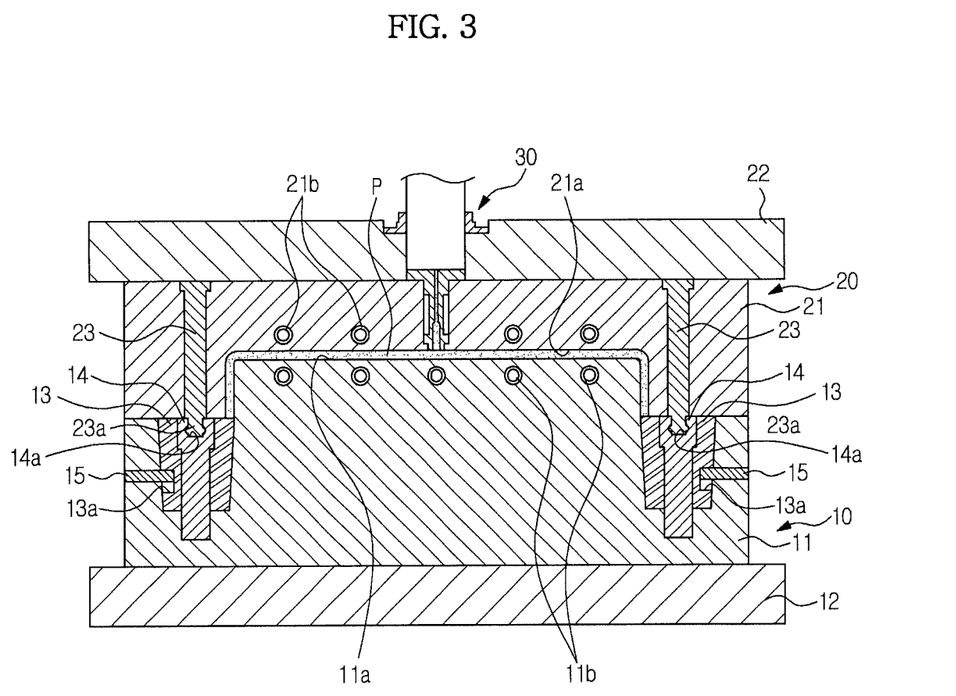
Figure 4:
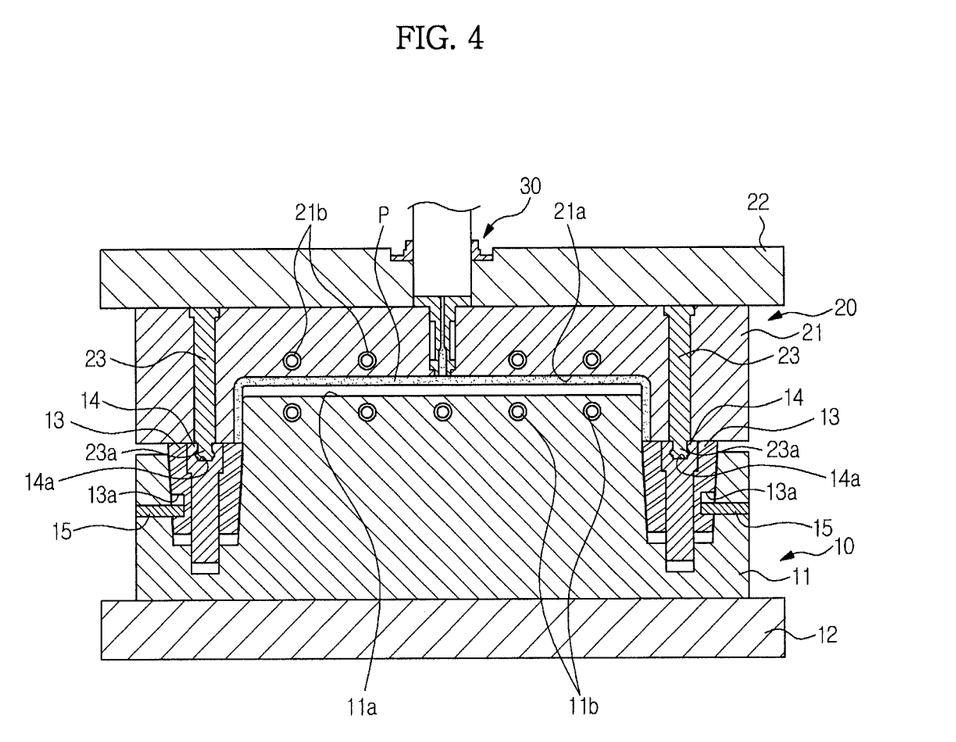

As illustrated on FIG. 3, after the manufacturing of the injection-molded product 'P' is completed at an inside the cavity 'C' as the molten resin is hardened at an inside the cavity 'C', as illustrated on FIG. 4, the second mold 20 is moved toward an upper side to be separated from the first mold 10.

Since the sliding core 13 is connected to the first guide 14 and the second guide 23, the sliding core 13 moves together with the second mold 20 toward an upper side. At this time, the movement of the sliding core 13 is regulated by the regulation member 15, and thus the sliding core 13 is stopped after moving a certain distance.

According to the movement of the sliding core 13, an upper surface of the sliding core 13 pushes the injection-molded product 'P' toward an upper side, and thus the injection-molded product 'P' moves together with the sliding core 13 in a certain distance and is partially separated from the first core 11.

Figure 5:
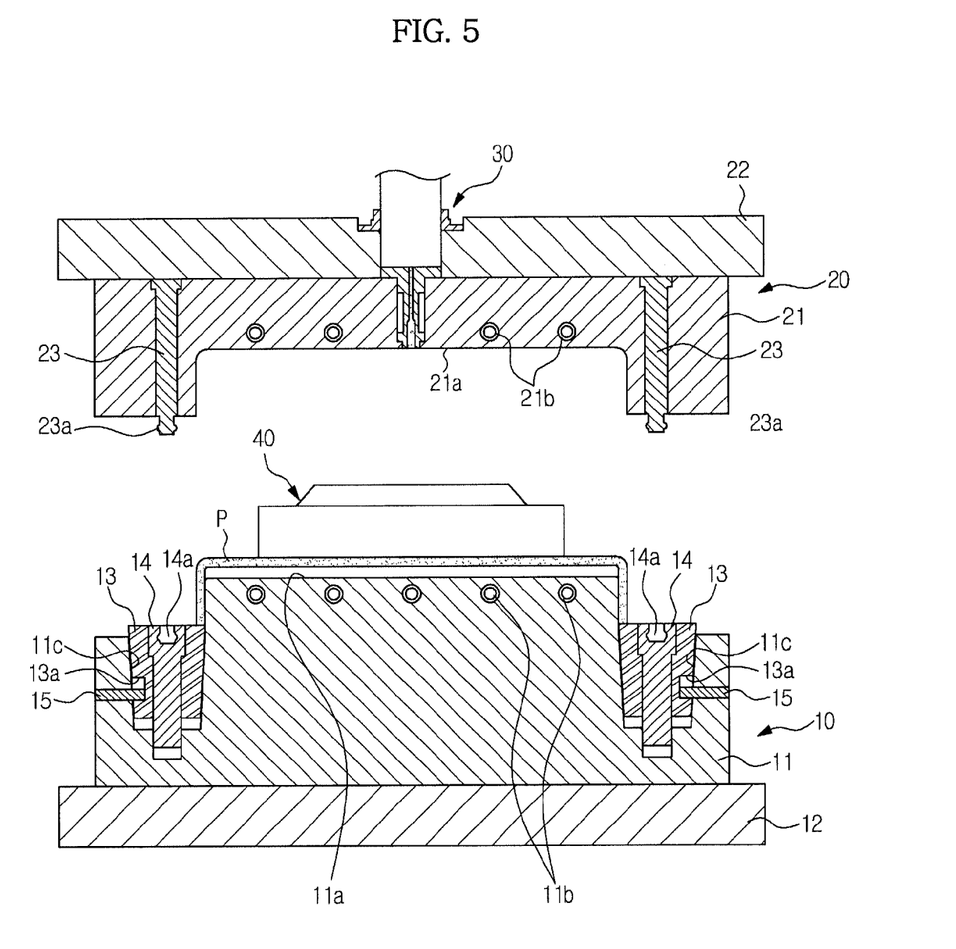

After the movement of the sliding core 13 is stopped, the coupling protrusion 23a is separated from the coupling groove 14a by the force that moves the second mold 20 and thus the first guide 14 and the second guide 23 are separated from each other, while the second mold 20, as illustrated on FIG. 5, is stopped after additionally moving a certain distance.

Figure 6:
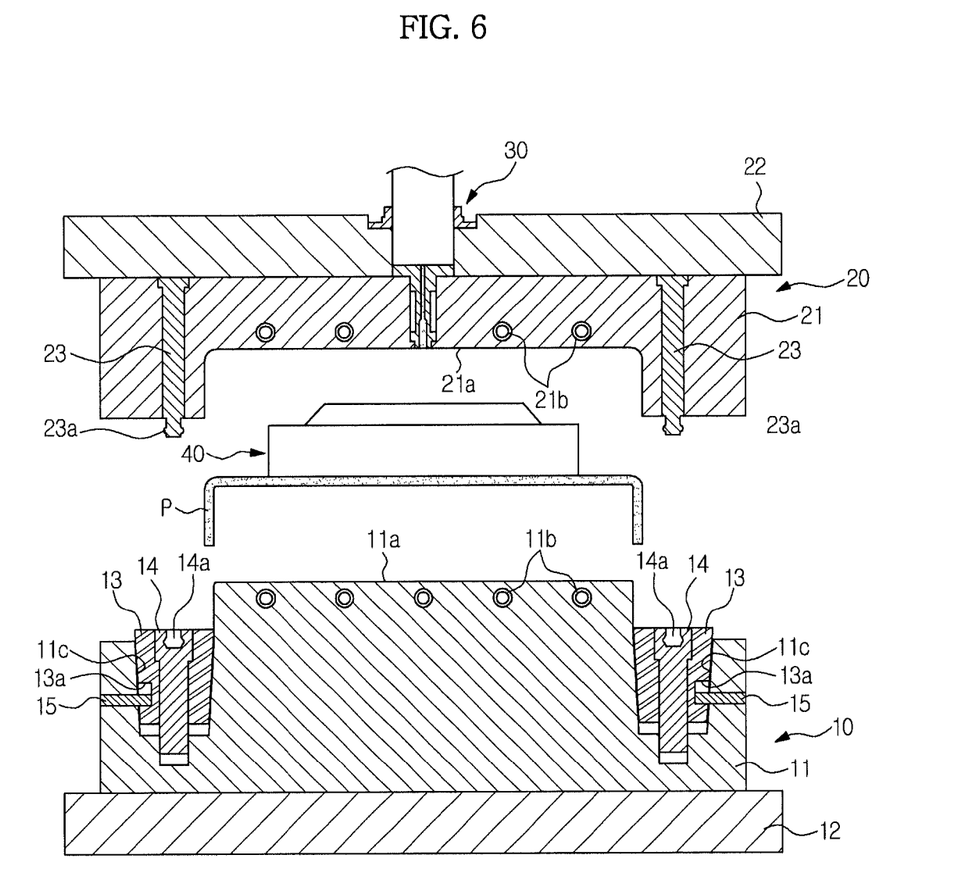

As such, in a state of the first mold 10 and the second mold 20 spaced apart, the adsorption apparatus 40 is entered in between the first mold 10 and the second mold 20 through subordinate apparatus such as a robot arm, and as the adsorption apparatus 40, which is entered in between the first mold 10 and the second mold 20, moves upward/downward to adsorb the injection-molded product 'P', as illustrated on FIG. 6, to completely separate the injection-molded product 'P' from the first core 11.

As the above, the separation of the injection-molded product 'P' is mostly performed by the adsorption apparatus 40, which is separately composed from the first mold 10 and the second mold 20, so components configured to separate the injection-molded product 'P' may be significantly simplified or omitted at the first mold 10 and the second mold 20, and accordingly, the designing of other components such as the cooling path 11b becomes convenient.

In the embodiment, the injection-molded product 'P' is configured to be completely separated from the first core 11 by the adsorption apparatus 40 after being partially separated from the first core 11 by the sliding core 13, but the present disclosure is not limited hereto, and having the separation performed only by the adsorption apparatus 40 may be possible.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An injection mold, comprising:
   a first mold;
   a second mold disposed opposite to the first mold and configured to form a cavity having a shape that corresponds to an injection-molded product to be manufactured by being coupled to the first mold;
   an injection apparatus configured to inject molten resin in the cavity; and
   an adsorption apparatus configured to adsorb and separate the injection-molded product which is manufactured by the first mold and the second mold, from the first mold,
   wherein separation movement of the second mold causes the injection-molded product to partially separate from the first mold.

2. The injection mold of claim 1, wherein:
   the adsorption apparatus, in a state that the first mold and the second mold are spaced apart, is entered in between the first mold and the second mold to adsorb the injection-molded product.

3. The injection mold of claim 1, wherein:
   the first mold comprises a first core provided with a first mold surface having a shape that corresponds to one side surface of the injection-molded product to be manufactured, a sliding core movably installed at the first core, and a regulation member configured to regulate an movement of the sliding core, and
   the second mold comprises a second core provided with a second mold surface having a shape that corresponds to the other side surface of the injection-molded product to be manufactured.

4. The injection mold of claim 3, wherein:
the sliding core comprises a regulation groove provided at one side thereof and into which a front end of the regulation member is entered.

5. The injection mold of claim 3, further comprising:
a first guide configured to guide the movement of the sliding core while installed at the sliding core; and
a second guide selectively coupled to the first guide while installed at the second core.

6. The injection mold of claim 5, wherein:
one of the first guide and the second guide comprises a coupling protrusion being coupled to the other one of the first guide and the second guide, and
the other one of the first guide and the second guide comprises a coupling groove being coupled to the coupling protrusion.

7. The injection mold of claim 3, wherein:
at least one of the first core and the second core comprises a cooling path through which cooling fluid passes.

8. An injection mold comprising:
a first and second mold that separately connected to each other that form a cavity to receive a resin to form a product;
wherein the first mold comprises a sliding core that moves allowing the sliding core to partially separate the product from the first mold;
wherein the second mold is vertically movable and is disposed above the first mold; and
wherein the vertically movement of the second mold causes the sliding core to move.

9. The injection mold of claim 8, wherein:
the first mold comprises a first core provided with a first mold surface having a shape that corresponds to one side surface of the injection-molded product to be manufactured and a regulation member configured to regulate an movement of the sliding core, and
the second mold comprises a second core provided with a second mold surface having a shape that corresponds to the other side surface of the injection-molded product to be manufactured.

10. The injection mold of claim 9, wherein:
the sliding core comprises a regulation groove provided at one side thereof and into which a front end of the regulation member is entered.

11. The injection mold of claim 9, further comprising:
a first guide configured to guide the movement of the sliding core while installed at the sliding core; and
a second guide selectively coupled to the first guide while installed at the second core.

12. The injection mold of claim 11, wherein the vertical movement of the second mold causes the second guide to engage and disengage from the first mold and causes the vertical movement of the sliding core.

13. The injection mold of claim 11, wherein:
one of the first guide and the second guide comprises a coupling protrusion being coupled to the other one of the first guide and the second guide, and
the other one of the first guide and the second guide comprises a coupling groove being coupled to the coupling protrusion.

14. The injection mold of claim 8, further comprising:
an adsorption apparatus configured to adsorb and separate the injection-molded product, which is manufactured by the first mold and the second mold, from the first mold.

15. The injection mold system, comprising:
an injection mold apparatus comprising a first and second mold that separately connected that form a cavity to receive a resin to form a product; and
an adsorption apparatus configured to separate the product from injection mold apparatus;
wherein the first mold comprises a sliding core that moves allowing the sliding core to partially separate the product from the first mold;
wherein the second mold is vertically movable and is disposed above the first mold; and
wherein the vertically movement of the second mold causes the sliding core to move.

16. The injection mold system of claim 15, wherein:
the sliding core comprises a regulation groove provided at one side thereof and into which a front end of the regulation member is entered.

17. The injection mold system of claim 16, further comprising:
a first guide configured to guide the movement of the sliding core while installed at the sliding core; and
a second guide selectively coupled to the first guide while installed at the second core.

18. The injection mold system of claim 17, wherein the vertical movement of the second mold causes the second guide to engage and disengage from the first mold and causes the vertical movement of the sliding core.

19. The injection mold system of claim 17, wherein:
one of the first guide and the second guide comprises a coupling protrusion being coupled to the other one of the first guide and the second guide, and
the other one of the first guide and the second guide comprises a coupling groove being coupled to the coupling protrusion.

* * * * *

UNITED STATES PATENT AND TRADEMARK OFFICE
CERTIFICATE OF CORRECTION

| | |
|---|---|
| PATENT NO. | : 8,998,604 B2 |
| APPLICATION NO. | : 13/712264 |
| DATED | : April 7, 2015 |
| INVENTOR(S) | : Hak Do Kim |

It is certified that error appears in the above-identified patent and that said Letters Patent is hereby corrected as shown below:

In the Claims

Claim 1, Column 4, Line 47:

delete "product" and insert --product,--, therefor.

Signed and Sealed this
Twenty-first Day of July, 2015

Michelle K. Lee
*Director of the United States Patent and Trademark Office*